(12) United States Patent
Lingen

(10) Patent No.: US 10,592,375 B1
(45) Date of Patent: *Mar. 17, 2020

(54) METHOD AND APPARATUS OF ESTABLISHING CUSTOMIZED NETWORK MONITORING CRITERIA

(71) Applicant: OPEN INVENTION NETWORK LLC, Durham, NC (US)

(72) Inventor: Mark Thomas Lingen, Woodinville, WA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,593

(22) Filed: Mar. 26, 2019

Related U.S. Application Data

(63) Continuation of application No. 15/283,875, filed on Oct. 3, 2016, now Pat. No. 10,241,883, which is a continuation of application No. 12/983,002, filed on Dec. 31, 2010, now Pat. No. 9,459,983.

(51) Int. Cl.
*G06F 21/00* (2013.01)
*G06F 11/30* (2006.01)
*H04L 12/26* (2006.01)

(52) U.S. Cl.
CPC ...... *G06F 11/3072* (2013.01); *G06F 11/3013* (2013.01); *G06F 11/3024* (2013.01); *G06F 11/3041* (2013.01); *H04L 43/065* (2013.01)

(58) Field of Classification Search
CPC . G06F 11/3072; G06F 11/3024; H04L 43/065
See application file for complete search history.

(56) References Cited

U.S. PATENT DOCUMENTS

| | | | |
|---|---|---|---|
| 7,353,269 B2 | 4/2008 | Aki et al. | |
| 7,523,191 B1 | 4/2009 | Thomas et al. | |
| 8,374,823 B1* | 2/2013 | Williams | G06F 11/3058 702/183 |
| 9,639,379 B1* | 5/2017 | Suit | G06F 9/45558 |
| 2003/0236875 A1 | 12/2003 | Green et al. | |
| 2005/0234864 A1 | 10/2005 | Shapiro | |
| 2008/0082657 A1* | 4/2008 | Hart | H04L 41/0681 709/224 |

(Continued)

*Primary Examiner* — Chau Le

(57) ABSTRACT

A method and apparatus of monitoring computer devices operating on a network is disclosed. Computer devices are all different and require monitoring settings that are tailored to their specific requirements. One example of the present invention may include a method of monitoring at least one computer device operating on a network. The method may include receiving audit information representing attributes of the computer device and storing the audit information in memory. The method may also include comparing the audit information to a predefined monitor set of objects to be monitored. The method may further include creating a new monitor set based on the comparison of the audit information and the predefined monitor set. The new monitor set is different from the predefined monitor set and is generally used to monitor objects which are included in the audited device. The method may also include monitoring the at least one computer device based on the new monitor set.

20 Claims, 5 Drawing Sheets

(56) References Cited

U.S. PATENT DOCUMENTS

| | | | |
|---|---|---|---|
| 2009/0063672 A1* | 3/2009 | Kaminsky | H04L 43/0805 709/224 |
| 2010/0049732 A1* | 2/2010 | Fong | G06F 16/88 707/803 |
| 2010/0229014 A1* | 9/2010 | Blackburn | G06F 1/3203 713/323 |
| 2011/0238377 A1* | 9/2011 | Scarpelli | G06F 11/3409 702/186 |
| 2011/0238906 A1* | 9/2011 | Amir | G06F 3/0611 711/111 |
| 2012/0173703 A1* | 7/2012 | Lingen | G06F 11/3013 709/224 |
| 2013/0132553 A1 | 5/2013 | Stratton et al. | |

\* cited by examiner

METHOD AND APPARATUS OF ESTABLISHING CUSTOMIZED NETWORK MONITORING CRITERIA

TECHNICAL FIELD OF THE INVENTION

This invention relates to a method and apparatus of establishing valid network device monitoring criteria, and, more specifically, to auditing network devices on a network and determining which objects associated with the network devices need to be monitored and which objects do not require monitoring.

BACKGROUND OF THE INVENTION

Automated computer device monitoring services are commonplace in the information technology world today. All types and variations of computers, handheld devices, laptops, smartphones, servers, terminals or other computing devices are generally part of a communication network. As a result, computing devices have been utilizing automated network services to centrally manage and monitor various features, such as, device performance and activity. For example, a laptop or desktop computer operated by an employee of a corporation may receive multiple daily management processes and scheduled maintenance routines from a remote server during the course of day. Other devices that are routinely monitored may include a router, switch or other network device connected to the network.

Examples of management monitoring processes may include monitoring computer device services, processes and device metrics, such as, memory availability, application use, hard disk space, software driver updates and software patches, etc. However, it is not a simple task to monitor hundreds or even thousands of computers across an entire enterprise. For instance, the individual network devices operating on a network may have customized applications, hardware components, etc., and may not require certain monitoring operations to be performed.

A typical monitor set may include instructions for monitoring all drives (hard disks and virtual drives) on a particular machine, such as, the "A:", "B:", "C:", "D:" and "E:" drives, and so on. However, a laptop computer may only have a "C:" and "D:" drive as part of its hardware profile. In such a case, the predefined monitoring operations of the specific monitor sets, if applied to the laptop, may still perform monitoring on all of the predefined drives. This may return unnecessary errors, and may require extra time and processing to perform these unneeded monitoring operations. Performing a monitor operation of five drives on a machine that only has two drives may provide unfavorable results.

By discovering valid objects belonging to corresponding network elements, tailored monitoring operations may be setup and performed to reduce errors, time and network resources.

SUMMARY OF THE INVENTION

One embodiment of the present invention may include a method of monitoring at least one computer device operating on a network. The method may include receiving audit information representing attributes of the at least one computer device and storing the audit information in a memory, and comparing the audit information to a predefined monitor set of objects to be monitored. The method may also include creating a new monitor set based on the comparison of the audit information and the predefined monitor set, the new monitor set is different from the predefined monitor set, and monitoring the at least one computer device based on the new monitor set.

Another example embodiment of the present invention may include an apparatus configured to monitor at least one computer device operating on a network. The apparatus may include a memory configured to store audit information. The apparatus may also include a receiver configured to receive the audit information representing attributes of the at least one computer device and store the audit information in the memory, and a processor configured to compare the audit information to a predefined monitor set of objects to be monitored and create a new monitor set based on the comparison of the audit information and the predefined monitor set, the new monitor set is different from the predefined monitor set, and to monitor the at least one computer device based on the new monitor set.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
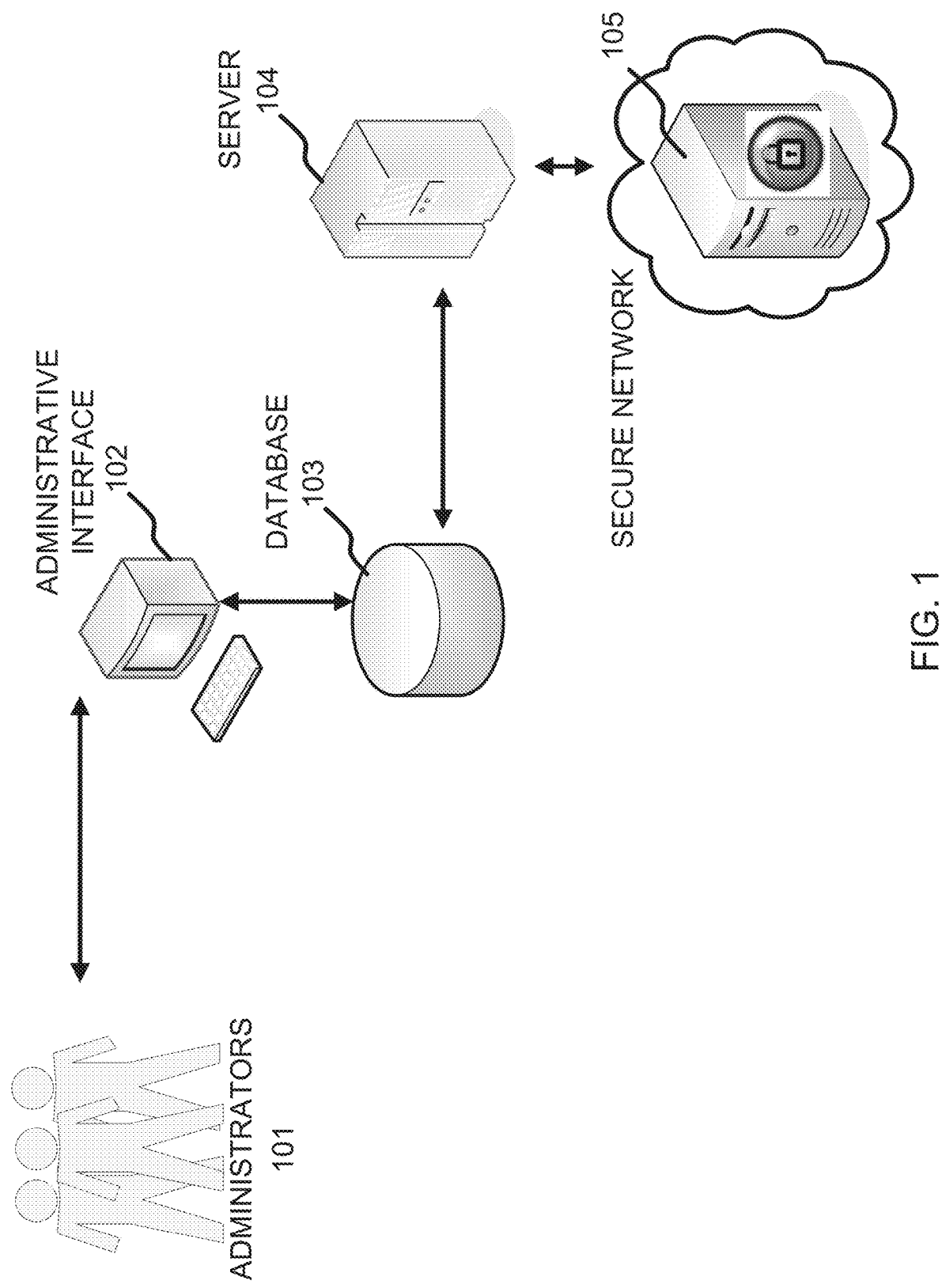
FIG. 1 illustrates an example network configuration, according to example embodiments of the present invention.

FIG. 1 illustrates an example communication network, according to example embodiments of the present invention. Referring to FIG. 1, administrators 101 may access an administrative user interface 102 to begin operating a monitoring procedure. The interface may be a virtual system administrator (VSA) interface that is accessible via a user terminal computer or other interface device. The VSA interface is a functional interface that may be used to perform operations and functions and control program execution.

The administrators 101 may perform assignments to setup a "monitor set" of parameters. The monitor set may include objects and corresponding thresholds defined by counters. The objects that may be monitored may include computer parameters, such as, processor use, memory availability, application use, hard disk space, updated software drivers and patches, etc. The monitor sets may be predefined monitors sets that monitor a predetermined list of device objects.

Figure 2:
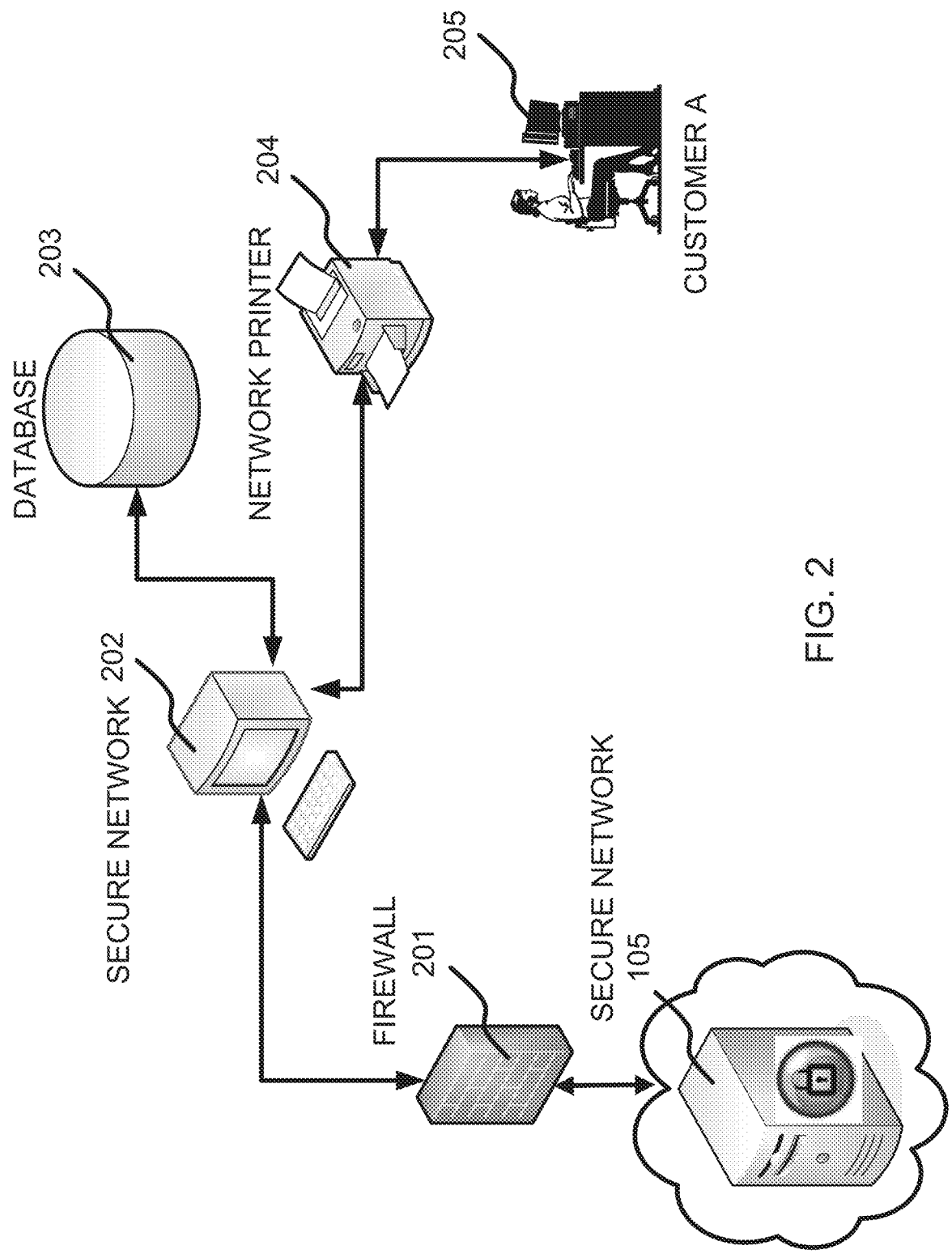
FIG. 2 illustrates another example network configuration, according to example embodiments of the present invention.

Each network device operating within the networks illustrated in FIGS. 1 and 2 may have different attributes, such as, different hardware configurations and/or varying applications that are used/installed on the different network devices. Examples of attributes are processor type, memory capacity, hard disk size, number of disks (physical and/or logical), processes, applications, etc. As a result, such varying configurations will result in varying object sets that are derived from an audit operation of the respective network devices.

An automatic learning ("auto-learn") procedure may be used to create a new monitor set. The auto-learn procedure may be used to monitor current operating conditions of computers on the network and dynamically set new threshold values. Certain logic may be established as data collectors, which are used to guide the auto-learn procedure. For example, the amount of time or the duration of time that data is collected indicating the usage levels of certain objects of the network computers, may be a defined logic collector. The interval amount by which to increase or decrease an alarm threshold value may be defined as a maximum or minimum value that should not be exceeded or undermined under any circumstances, etc.

The auto-learn procedure may be setup and executed based on a trial run or test procedure of monitoring the behavior of one or more computers on the network. Initially, a baseline or predefined monitor set may be deployed based on one or more default objects to be monitored. The monitor set may be initiated by the administrative interface 102 and may be used to analyze the compiled or collected user object data stored in the database 103. The server 104 may be setup to perform the monitor set deployment procedure by monitoring the individual customer computers and storing the retrieved object data in the database 103.

Monitoring customer computers may be performed by executing monitoring procedures and accessing customers remotely via a secure network portal 105. Continuing with the network communication of FIG. 1, the flow of data is further illustrated with reference to FIG. 2. Referring to FIG. 2, the secure network 105 includes a firewall 201 that may be authenticated to obtain access to the customer network. A secure network 202 provides access to customer computers, such as, customer A 205. Other devices on the network may be monitored, such as, a network printer 204, print server or email server, etc. A database 203 may provide access to customer data and related customer information.

According to example embodiments of the present invention, it may be necessary to audit each of the network computing devices to determine the customized objects associated with each device. By determining the objects associated with the operation of each audited device, the customized monitor sets may be scaled back to remove unnecessary auditing of objects not relevant to each device. Each audited device provides the capability to derive a monitor set customized for that device. For example, if a monitor set was setup to monitor the "E:" disk drive and was applied to monitor a device without any "E:" disk drive, then processor speed, time, and resources are wasted during this monitoring procedure.

Auditing devices across the network may include accessing the devices locally, or remotely via the Internet and/or through a secure firewall. A derived monitor set that is based on the audited information obtained from the device would yield a new monitor set that does not monitor objects that don't exist on machines.

A specified parameter may be used to trigger the customized monitor set, for example, "ALL*", which indicates that all objects are to be monitored except those which are not discovered on the audited device. This parameter will trigger a validation of the audited information for a particular device and dynamically generate a monitor set based on the specific objects included in the device but not to include objects that are not part of the device.

The "ALL*" parameter is a type of monitor object that will initiate the dynamic creation of a monitor set. Audit information may be relied upon when implementing the "ALL*" parameter. When a monitor set of objects to be monitored is applied to a network device along with an "ALL*" parameter, an automatic generation of objects that need to be monitored for that particular network device will be initiated for subsequent monitoring procedures. The monitor set created may be modified to include additional objects discovered and/or objects that require continued monitoring. A new audit procedure may trigger a change in the monitor set of objects to be monitored. For example, if a service operating on a particular network device was modified to not be automatic on a particular network device, then the present monitor set would be reconfigured for that specific network device without any interaction to reflect the modification.

Figure 3:
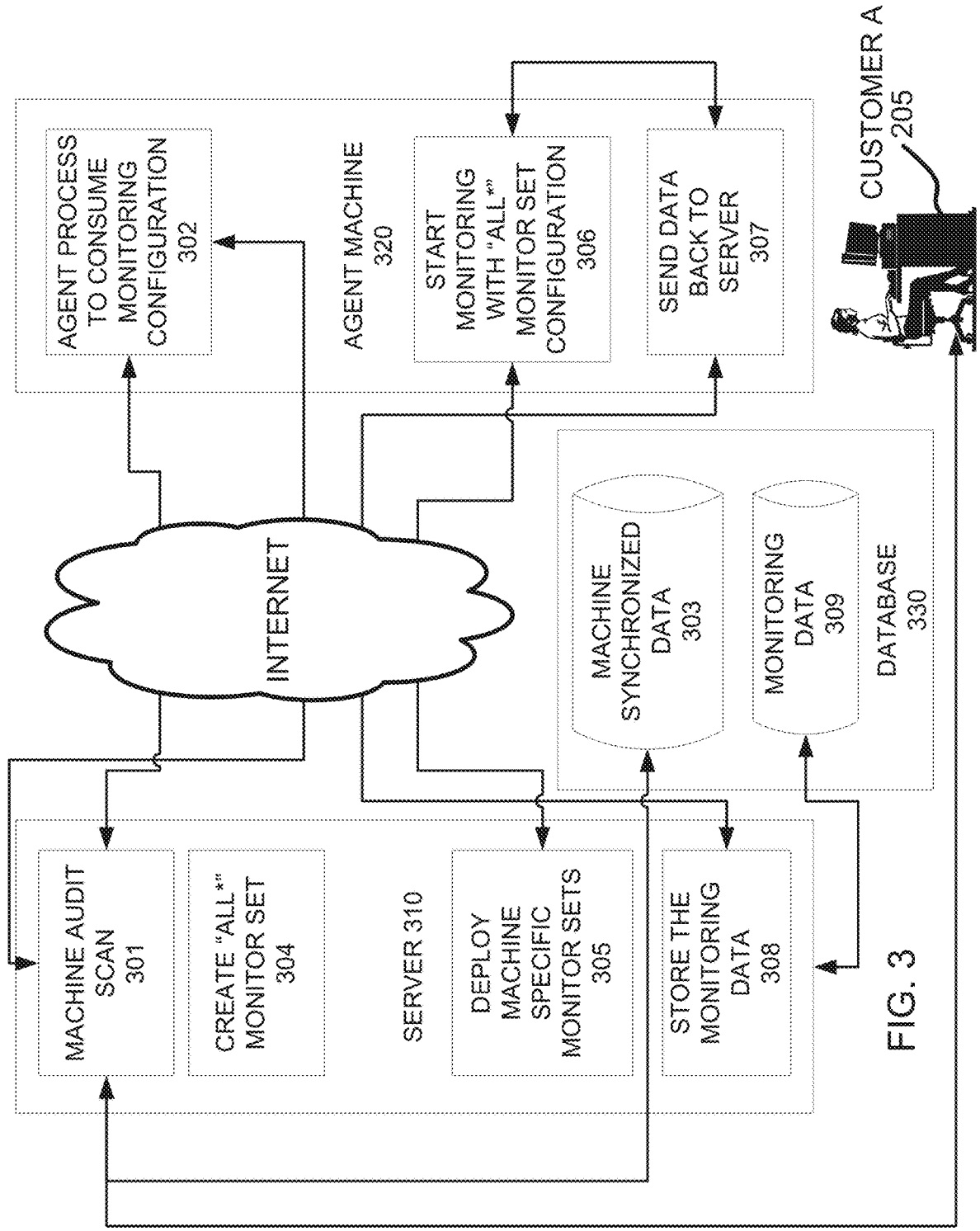
FIG. 3 illustrates an example data logic diagram, according to example embodiments of the present invention.

FIG. 3 illustrates an example flow diagram and logic diagram of operations performed according to example embodiments of the present invention. Referring to FIG. 3, a machine audit scan is initiated at operation 301. The audit may be performed by the server 310 of the monitoring administrative side of the network. The server 310 may be the same as the server 104 of FIG. 1. The audit scan is sent to an agent machine or device 320, which acknowledges the audit and performs a process to consume the monitoring configuration, at operation 302. Operation 302 may be a scheduled process that gathers changes and automatically triggers a redeployment of a monitor set.

As audit data is received at the server 310, the data may be stored in a database 330 as machine synchronized data, at operation 303. A monitor set may then be created as a predefined "ALL*" monitor set, at operation 304. The "ALL*" parameter may trigger a customized monitor set creation process. At operation 305, the data received from the audit scan may be incorporated into a customized machine specific monitor set that is deployed across the Internet to agent machine 320, at operation 305. The agent machine 320 may then begin monitoring the end user device(s), which are not shown, based on the customized monitor set, at operation 306. The data is then sent back to the server 310, at operation 307.

The monitored data is then stored at operation 308 based on the customized monitor set of collected data. Such data may include object specific results of device(s) managed by the agent machine 320. The monitoring data is stored in the database 330 at operation 309, the customer A 205 is included for example purposes to illustrate an end user device that may be monitored based on the customized monitor set.

Based on the logic diagram of FIG. 3, the workflow process of auditing a specific device(s) and creating a monitor set that is customized for that device's attributes is further described below. A request may be sent to all machines/devices that are being managed to obtain all of the monitoring configurations from those machines/devices. One example may include obtaining a list of all current programs being executed on a particular device. Another example would include obtaining a list of all disk drives on a particular machine.

The network device may have a process that is used to gather all of its audit data, such as, a brute force test that audits all software processes, applications and hardware components and reports the results. The resulting audit data is then forwarded back to the server to be stored in a database 330 for future use. The auditing may be scheduled to ensure regular changes are kept up-to-date automatically. The regular intervals keeps the server and user devices synchronized. The changes can be logged in memory and the "ALL*" monitor set can be modified to reflect the changes. The "ALL*" monitor set can be deployed and re-deployed to initiate monitoring at regular intervals without any administrative interaction. This audit procedure ensures that no objects are monitored, which are not part of the network device's present operations.

The administrator may perform a manual creation of the "ALL*" monitor set by adding and subtracting objects to be monitored. In operation, when an "ALL*" monitor set is deployed to a machine, the monitoring engine will derive the monitor set according to the audit information from each machine. The configuration derived may be stored in XML and deployed to the agent to notify the agent which objects to monitor. The data collected from each device is sent back to the server and stored in memory. Updated data may be received to update the data stored in memory.

Updated "ALL*" lists will monitor objects that exist on all devices. There may be multiple "ALL*" lists available for multiple different devices. The scheduling of the audits will automatically update any changes to the devices so that all monitor sets may be updated and used to continue collecting monitored data without performing monitoring of objects that are not present on the devices.

Figure 4:
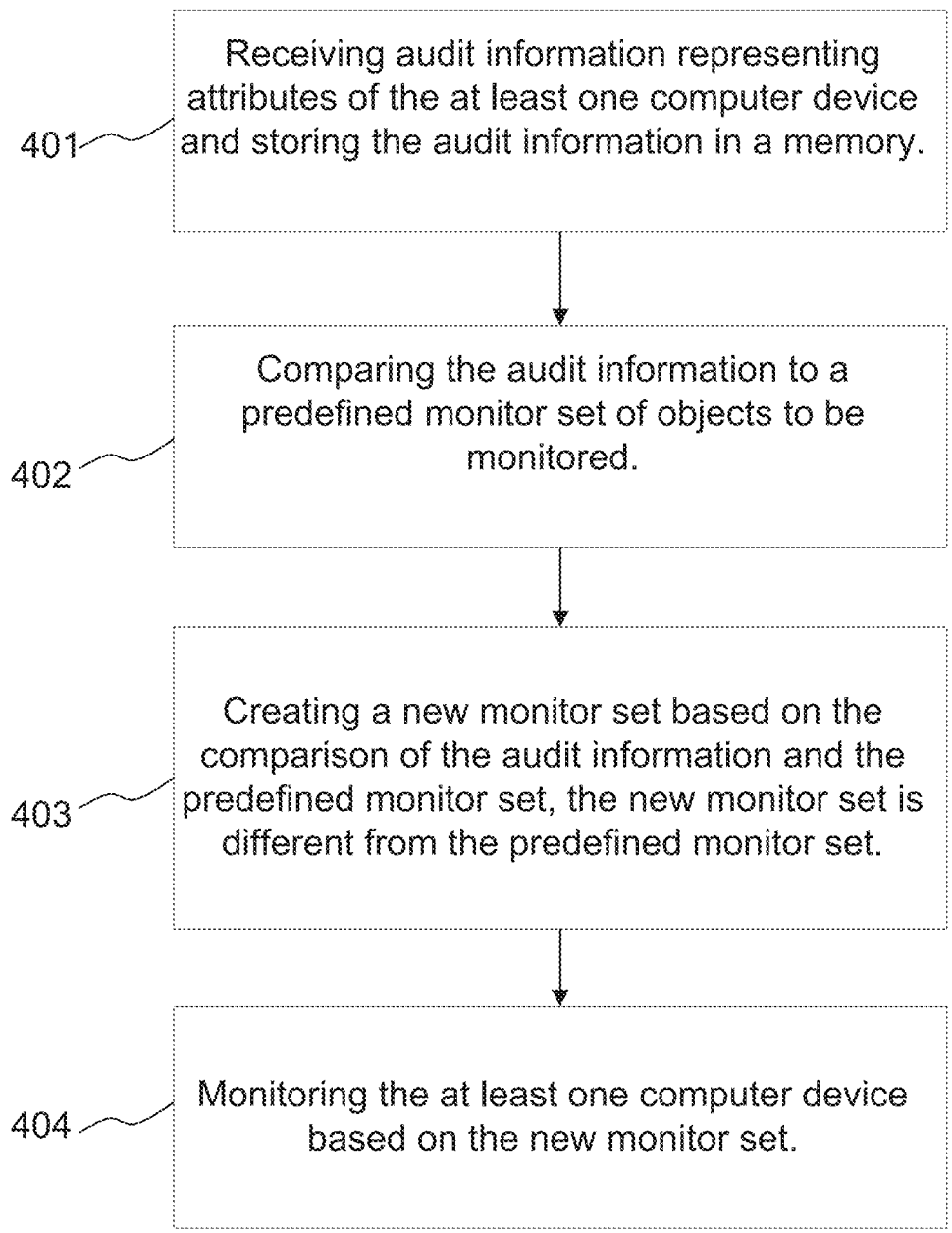
FIG. 4 illustrates an example method, according to example embodiments of the present invention.

One example method of monitoring at least one computer device operating on a network is illustrated in FIG. 4, according to example embodiments of the present invention. Referring to FIG. 4, a request may be sent and the server may receive audit information representing attributes of a computer device(s), which may be stored as audit information in a memory, at operation 401. Other operations include comparing the audit information to a predefined monitor set of objects to be monitored, at operation 402 and creating a new monitor set based on the comparison of the audit information and the predefined monitor set at operation 403. The new monitor set is different from the predefined monitor set. Another operation may include monitoring the at least one computer device based on the new monitor set.

The audit information may be automatically transferred from the computer device to a server more than once based on a predefined update schedule. The example method noted above may also include determining objects present in the audit information and comparing the objects present in the audit information to objects present in the predefined monitor set and creating the new monitor set by removing the objects present in the predefined monitor set which are not preset in the audit information and renaming the predefined monitor set to represent the new monitor set. This provides a process of creating a new monitor set without objects that do not require monitoring.

Examples of attributes include information regarding hardware configurations and software configurations present in the computer device. For example, the attributes may include disk information, processor information, memory information, application information and service information. The updated or new monitor set may be stored in the memory in an XML file format. The computer devices audited to derive the monitor set may then be monitored based on the objects included in the new monitor set. Periodically, the new monitor set may continue to be updated to reflect changes that occur to the objects based on the update schedule.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components 102, 103, 104, 105, 201, 202 and 203.

Figure 5:
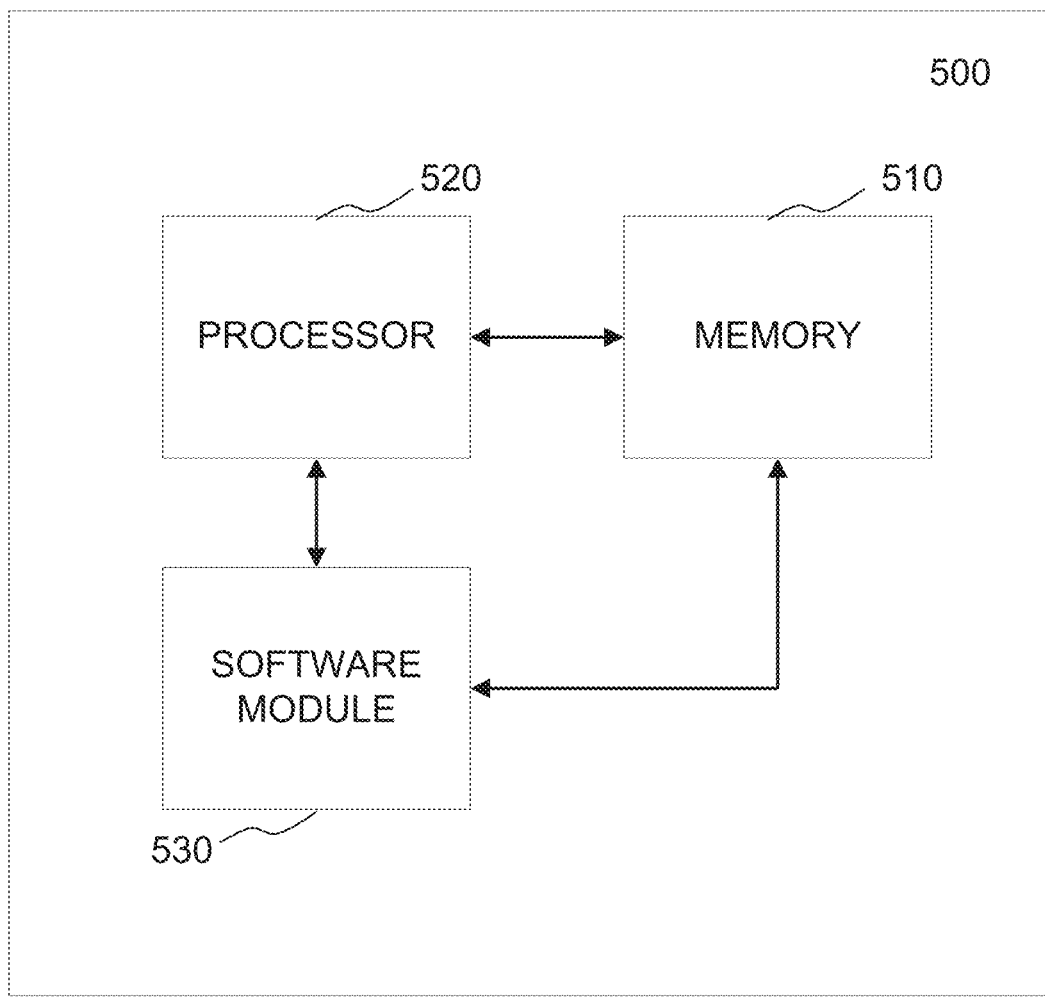
FIG. 5 illustrates an example network entity configured to store and execute any of the example applications described in the specification, according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    initiating an all objects trigger command to monitor a predefined monitor set of all objects except objects which are identified as not discoverable on at least one computer device based on audit information obtained during an audit session;
    receiving, via a receiver of another computer device, the audit information representing device hardware attributes and device software attributes of the at least one computer device and storing the audit information in a memory, wherein the audit information comprises at least one less object to be monitored than the predefined monitor set of all objects originally intended to be monitored by the all objects trigger command;
    comparing, via a processor of the another computer device, the audit information to the predefined monitor set of all objects intended to be monitored on the at least one computer device;
    responsive to the comparing, removing at least one object present in the predefined monitor set of all objects initiated by the all objects trigger command which is not identified from the audit information;
    creating, via the processor of the another computer device, a new monitor set of objects based on the comparison of the audit information and the predefined monitor set of all objects, wherein the new monitor set of objects has at least one fewer objects to be monitored than the predefined monitor set of all objects; and
    monitoring, via the processor of the another computer device, the at least one computer device based on the new monitor set of objects.

2. The method of claim 1, wherein the audit information is automatically transferred from the at least one computer device to a server more than once based on a predefined update schedule.

3. The method claim 2, further comprising determining objects present in the audit information and comparing the objects present in the audit information to objects present in the predefined monitor set of all objects.

4. The method of claim 3, further comprising storing the new monitor set of objects in the memory in an XML file format and monitoring the at least one computer device based on the objects included in the new monitor set of objects.

5. The method of claim 3, further comprising modifying the new monitor set of objects to reflect changes that occur to the objects based on the update schedule.

6. The method claim 1, further comprising renaming the predefined monitor set of all objects to represent the new monitor set of objects.

7. The method of claim 1, wherein the hardware attributes and the software attributes comprise at least one of disk information, processor information, memory information, application information and service information.

8. An apparatus, comprising:
    a memory configured to store audit information;
    a receiver configured to receive the audit information that represents device hardware attributes and device software attributes of at least one computer device and store the audit information in the memory; and
    a processor configured to
    initiate an all objects trigger command to monitor a predefined monitor set of all objects except objects which are identified as not discoverable on the at least one computer device based the audit information obtained during an audit session;
    compare the audit information to the predefined monitor set of all objects to be monitored on the at least one computer device, wherein the audit information comprises at least one less object to be monitored than the predefined monitor set of all objects originally intended to be monitored by the all objects trigger command,
    responsive to the compare operation, remove at least one object present in the predefined monitor set of all objects initiated by the all objects trigger command which is not identified from the audit information,
    create a new monitor set of objects based on the comparison of the audit information and the predefined monitor set of all objects, and wherein the new monitor set of objects has at least one fewer objects to be monitored than the predefined monitor set of all objects, and
    monitor the at least one computer device based on the new monitor set of objects.

9. The apparatus of claim 8, wherein the audit information is automatically transferred from the at least one computer device to a server more than once based on a predefined update schedule.

10. The apparatus of claim 9, wherein the processor is further configured to determine objects present in the audit information and compare the objects present in the audit information to objects present in the predefined monitor set of all objects.

11. The apparatus of claim 10, wherein the processor is further configured to store the new monitor set in the memory in an XML file format and monitor the at least one computer device based on the objects included in the new monitor set of objects.

12. The apparatus of claim 10, wherein the processor is further configured to modify the new monitor set of objects to reflect changes that occur to the objects based on the update schedule.

13. The apparatus of claim 8, wherein the processor is further configured to rename the predefined monitor set of all objects to represent the new monitor set of objects.

14. The apparatus of claim 8, wherein the hardware attributes and the software attributes comprise at least one of disk information, processor information, memory information, application information and service information.

15. A non-transitory computer readable storage medium comprising instructions that when executed cause a processor to perform:
    initiating an all objects trigger command to monitor a predefined monitor set of all objects except objects which are identified as not discoverable on at least one computer device based on audit information obtained during an audit session;
    receiving the audit information representing device hardware attributes and device software attributes of the at least one computer device and storing the audit information in a memory;
    comparing the audit information to the predefined monitor set of all objects to be monitored on the at least one computer device, wherein the audit information comprises at least one less object to be monitored than the predefined monitor set of all objects originally intended to be monitored by the all objects trigger command;

responsive to the comparing, removing at least one object present in the predefined monitor set of all objects initiated by the all objects trigger command which is not identified from the audit information;

creating a new monitor set of objects based on the comparison of the audit information and the predefined monitor set of all objects, wherein the new monitor set of objects has at least one fewer objects to be monitored than the predefined monitor set of all objects; and monitoring the at least one computer device based on the new monitor set of objects.

16. The non-transitory computer readable storage medium of claim 15, wherein the audit information is automatically transferred from the at least one computer device to a server more than once based on a predefined update schedule.

17. The non-transitory computer readable storage medium of claim 16, further comprising determining objects present in the audit information and comparing the objects present in the audit information to objects present in the predefined monitor set of all objects.

18. The non-transitory computer readable storage medium of claim 17, further comprising storing the new monitor set of objects in the memory in an XML file format and monitoring the at least one computer device based on the objects included in the new monitor set of objects.

19. The non-transitory computer readable storage medium of claim 15, further comprising renaming the predefined monitor set of all objects to represent the new monitor set of objects.

20. The non-transitory computer readable storage medium of claim 15, wherein the hardware attributes and the software attributes comprise at least one of disk information, processor information, memory information, application information and service information.

* * * * *